INVENTORS
AARON P. BEILER
DANIEL B. STOLTZFUS
AGENT

# United States Patent Office 3,182,782
Patented May 11, 1965

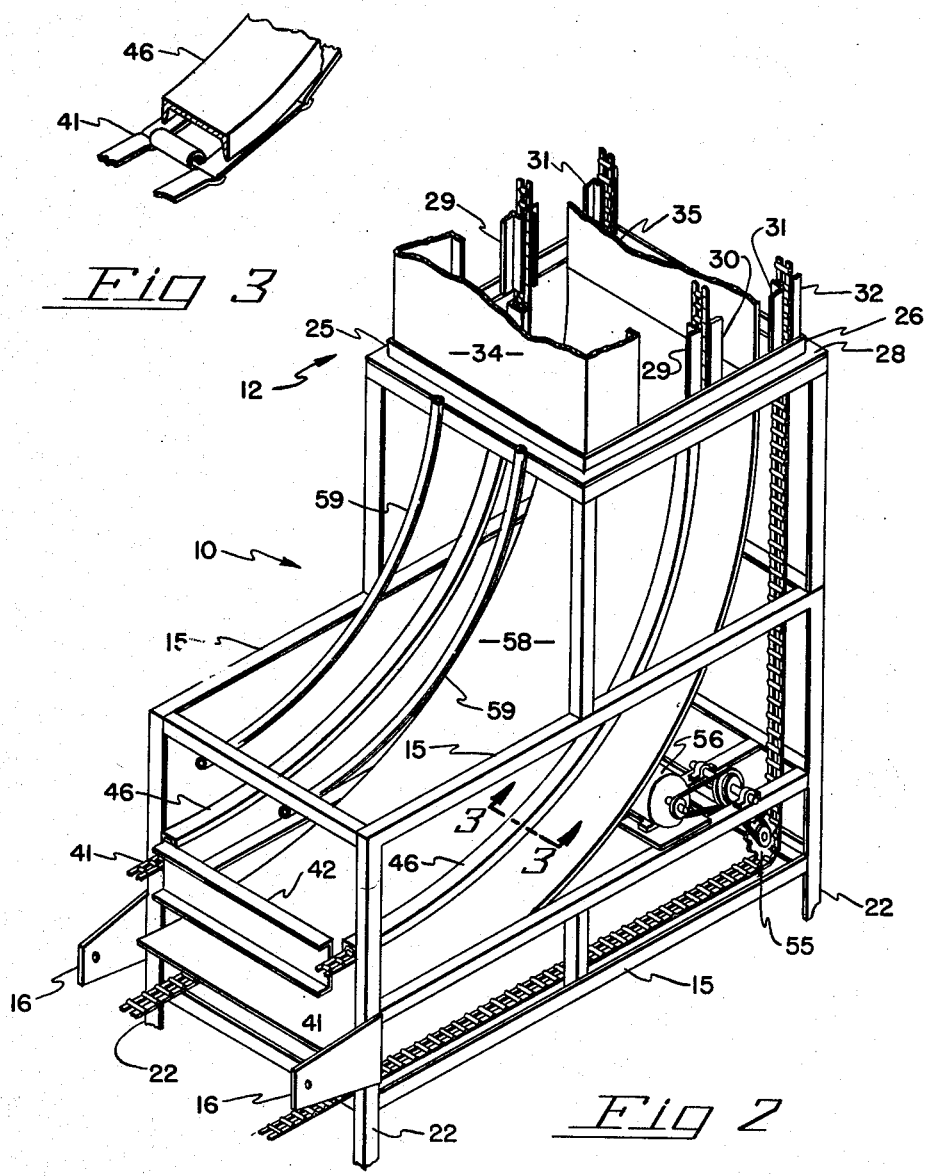

3,182,782
BALE CONVEYOR
Aaron P. Beiler, Blue Ball, and Daniel B. Stoltzfus, Kinzer, Pa., assignors to Sperry Rand Corporation, New Holland, Pa., a corporation of Delaware
Filed May 23, 1962, Ser. No. 196,991
1 Claim. (Cl. 198—7)

This invention relates to apparatus for conveying bales of hay or the like. More specifically, it relates to mechanism for elevating bales of hay from the ground to the storage mow of a barn.

Conveyor systems are commercially available to the farmer for moving baled hay from the ground into the storage mow of a barn. Generally, these systems include three major parts: A horizontal conveyor section which hangs just under the peak of the barn roof and extends the length of the barn; a device for discharging bales laterally from the horizontal conveyor section at any selected point along its length, whereupon the bales drop into the storage mow; and an elevator section for carrying the bales from the ground up and onto the horizontal conveyor.

The elevator sections of these systems are generally well known. They comprise, basically, an inclined ramp and an endless conveyor for moving bales up the ramp. The ramps are inclined upwardly from the ground to, and through, a loading door in the end of the barn near the peak of its roof where one end of the horizontal conveyor section is located. The loading doors are commonly thirty feet or more above the ground. Experience has shown that for satisfactory operation, these ramp elevators should not extend upwardly from the ground at an angle greater than approximately sixty degrees. Beyond this angle there is danger of the bales toppling back down the ramp. To elevate bales to a loading door thirty feet above the ground with the conventional ramp type elevator set at a sixty degree angle to the ground, the bottom end of the elevator must be located around eighteen feet from the barn wall at the ground. It will be apparent that the higher the barn loading door is located above the ground, the longer the elevator must be, and the more ground space is required. Since the inclined elevators are manufactured in certain standard lengths, the farmer must sometimes buy an elevator longer than he would actually need to reach his loading door with a ramp angle of sixty degrees. In this case, even more ground space is required for the elevator, since the bottom end must be moved farther away from the barn wall to lower the upper end of the ramp to the loading door. Frequently, buildings, highways, or other obstacles adjacent the barn simply do not allow enough space to set the elevators up. Even where available space permits the use of the ramp type elevators, they are generally moved away to a less obstructive storage place as soon as the hay crop is all in the barn so as not to present a hazardous obstacle for traffic around the barn.

Another source of trouble, where the ramp type elevator is employed, is in the discharging of bales from the elevator onto the above mentioned horizontal mow conveyor. The discharge end of the elevator should extend over, but in close proximity to, the mow conveyor so that bales can feed down onto the mow conveyor from the elevator. The inclined ramp elevators, however, extend upwardly a given distance for every given amount of horizontal extension. If the discharge end of the elevator is too far above the mow conveyor, the bale will attempt to turn over as it leaves the elevator. It will then land on end on the mow conveyor and will just as likely topple over the side of the mow conveyor as onto it. This problem is amplified when bales of various lengths are handled together.

It is an object of this invention to provide a bale elevator which may be employed where available ground space prohibits the use of the conventional inclined ramp elevators.

It is another object of this invention to provide a bale elevator which may be permanently attached to a barn and will not constitute an objectionable hazard to traffic around the barn.

It is another object of this invention to provide an elevator which will convey bales vertically between a lower level and an upper level.

It is another object of this invention to provide a bale elevator having a horizontal loading platform to facilitate safe and easy feeding of bales to the elevator shaft.

It is another object of this invention to provide a bale elevator having a horizontal loading platform which may be easily moved to a vertical storage position to conserve ground space around the elevator.

It is another object of this invention to provide a bale elevator having discharging means to facilitate delivery of bales from the elevator shaft onto a subsequent horizontal conveyor.

It is another object of this invention to provide a bale elevator capable of handling bales of different sizes and shapes without jamming.

It is another object of this invention to provide an inexpensive bale elevator of rugged construction and safe, dependable operation.

These and other objects and advantages of this invention will be apparent upon reference to the following specification and claim taken in conjunction with the accompanying drawings wherein:

FIG. 2 is a fragmentary isometric view of the base frame portion of the elevator shown in FIG. 1;

FIG. 3 is an enlarged detail view of a portion of the mechanism shown in FIG. 2 and taken on the line 3—3 of FIG. 2.

Figure 1:
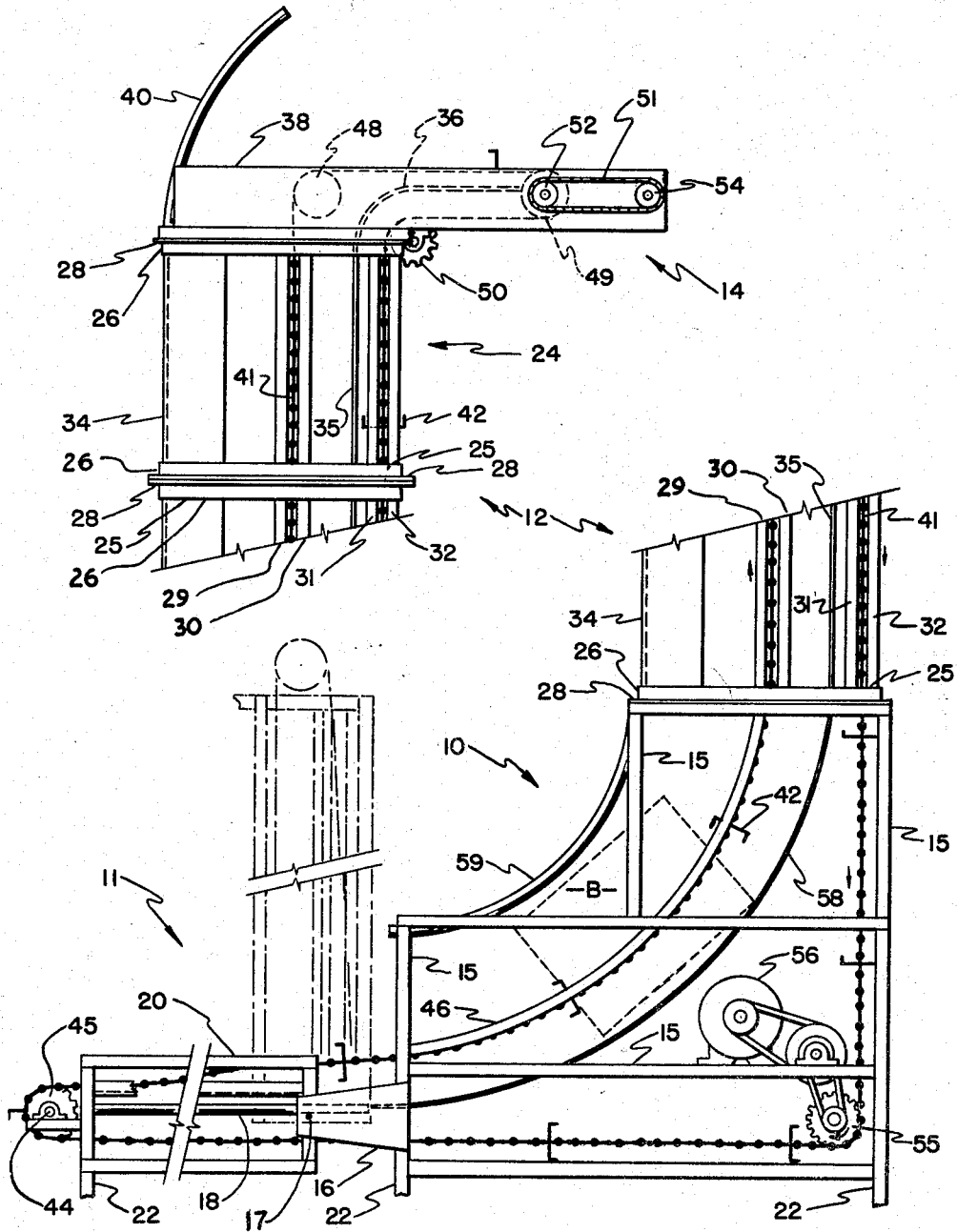
FIG. 1 is a fragmentary side elevational view of an elevator constructed in accordance with the principles of this invention, with the top portion of the elevator shown laterally displaced from its normal position, and with some parts shown diagrammatically.

The elevator of this invention is readily divisible into four general sections: A base frame section, indicated generally by the reference numeral 10 in the drawings; a bale receiving, or loading, platform 11; a vertical elevator shaft 12; and a horizontal discharge platform 14. The interrelation of these sections is best seen in FIG. 1.

The base frame 10, as best seen in FIG. 2, is made up of a plurality of angle iron frame members 15 rigidly interconnected to form a three dimensional space frame. A pair of brackets 16 is provided at one end of frame 10. The horizontal bale receiving platform 11 has one end connected to the brackets 16 by horizontal pivot members 17 (FIG. 1). Platform 11 comprises a frame structure having a pair of bale supporting rails 18 and 19 and a pair of bale guide rails 20 and 21. Both the loading platform and the base frame have downwardly extending legs 22 which support these structures on the ground.

The elevator shaft 12 is mounted on top of frame 10 wiht the open bottom end thereof spaced above the horizontal plane of platform 11. The shaft is made up of a plurality of interconnected sections. One complete section is shown in FIG. 1 and indicated generally by the reference numeral 24. All the shaft sections are identical except for their vertical lengths. Preferably the shaft sections are made in several different lengths so that the overall height of the elevator shaft may be regulated to within twelve inches by combining sections of different lengths. Shaft sections of eight foot, four foot, and one foot lengths have proven desirable.

Each shaft section comprises a four-sided horizontally disposed angle iron band 25 at its top and bottom ends. One flange 26 of each angle iron member lies in the vertical plane of one side of the shaft, while the other flange 28 of each angle iron member lies in a horizontal plane extending outwardly from the side of the shaft. On two of the opposing sides of the shaft a plurality of angle iron members 29, 30, 31 and 32 extend vertically between the top and bottom bands 25 and are rigidly connected thereto. The relative positions of the flanges of members 29, 30, 31 and 32 is of importance and is best seen in FIG. 2. The remaining two opposing sides of each shaft section are preferably sheet metal plates as shown at 34 and 35 in FIG. 2. As best seen in FIG. 2, the plate 35 is disposed between vertical angle iron members 30 and 31. The opposing plate 34 is preferably extended a short distance along the two adjacent sides of the shaft. This greatly increases the rigidity of the elevator shaft sections. Adjacent shaft sections are easily connected together by bolts (not shown) through the horizontal flanges 28 of the angle iron bands 25 at the ends of the adjacent shaft sections. In this manner the elevator shaft may be extended to any barn loading door.

Figure 4:
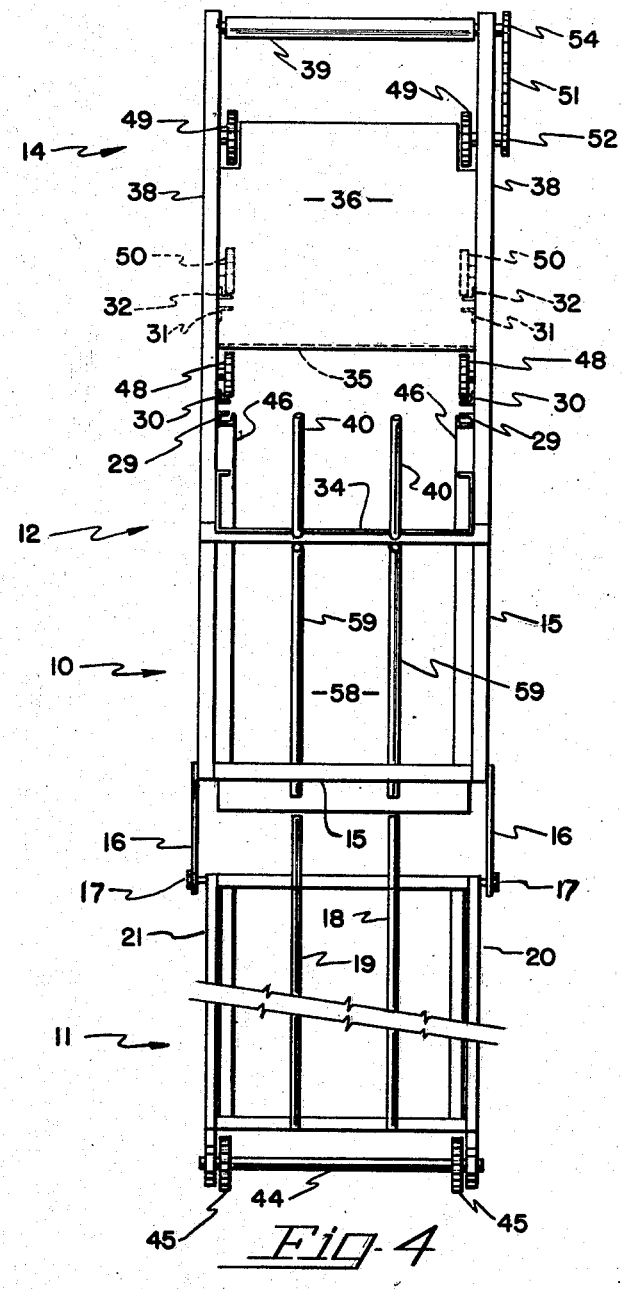
FIG. 4 is a fragmentary top plan view of the elevator with the conveyor chains removed.

The horizontal discharging platform 14 is mounted on the uppermost elevator shaft section 24 (FIG. 1) at the open top end of the elevator shaft. The discharging platform 14 comprises a sheet metal plate 36 mounted on and extending between a pair of horizontal beams 38. As best seen in FIG. 1, the beams 38 extend laterally in cantilever fashion from elevator shaft 12. As best seen in FIG. 4, the beams 38 extend beyond the end of plate, or platform, 36 and have journalled therein, and extending therebetween, a roller 39, or an equivalent rotary discharging member. A pair of curved bale deflecting members 40 are provided at the open top end of the elevator shaft for deflecting bales laterally onto platform 36 as they emerge from the open top end of the shaft.

A single endless conveyor comprising a pair of endless detachable link chains 41 and a plurality of bale engaging members, or pusher plates, 42 is used to move the bales from receiving platform 11 to discharging roller 39. Guide means for the endless conveyor chains 41 is provided on each of the major components, or sections 10, 11, 12 and 14 of the elevator. At the end of bale loading platform 11 remote from main frame section 10 is journalled a horizontal shaft 44 on which is carried a pair of chain guiding sprockets 45. A pair of arcuately shaped channel member chain guides 46 is mounted on main frame 10 and extend in an arc from the end of frame 10 adjacent bale receiving platform 11 to the top of frame 10 where the vertical angle iron members 29 of the lowermost elevator section terminate. The primary function of previously mentioned angle iron members 29, 30, 31 and 32 of the elevator shaft sections is to guide the endless conveyor chains 41 along the elevator shaft. Three pairs of sprockets 48, 49 and 50, respectively, are provided at the upper end of elevator shaft 12. These sprockets may be conveniently journalled on the supporting beams 38 of the discharging platform 36. The first pair of sprockets 48 is positioned so that the spaces between the vertical chain guiding members 29 and 30 lie tangential to the peripheries of sprockets 48. The second pair of sprockets 49 is disposed at the end of platform 36 remote from elevator shaft 12. Roller 39 may be conveniently driven from one of the sprockets 49 by an endless chain, or the like, 51 entrained about a pair of sprockets 52 and 54 mounted, respectively, on the shaft of one of the sprockets 49 and the shaft of roller 39. The pair of sprockets 50 is journalled below discharging platform 36 and arranged so that the spaces between the vertical angle iron members 31 and 32 of the elevator shaft extend tangential to the peripheries of these sprockets.

Referring now to FIG. 1 it will be seen that all the above chain guiding members cooperate to define a path of travel for a pair of endless chains, and that this path may be divided into a feed run and a return run. The feed run of the endless conveyor extends from the end of bale receiving platform 11 at sprocket 45 generally horizontally across platform 11 and around arcuate guide members 46 to the vertical shaft portion of the elevator. The endless chains then travel between guides 29 and 30 up the vertical elevator shaft at the sides thereof to sprockets 48 at the open top end of the shaft. The endless conveyor then travels horizontally across discharging platform 36 to sprockets 49. This ends the feeding run of the endless conveyor. The chains of the endless conveyor then return around sprockets 50 and down the space between angle iron chain guiding members 31 and 32 of the elevator shaft sections to a pair of driving pulleys or sprockets 55 located at the bottom rear portion of main frame 10 and driven in a conventional manner from motor 56. From driving sprockets 55, the chains extend horizontally back to sprockets 45 on bale receiving platform 11.

It will be seen from FIGS. 1 and 2 that the pusher members 42, extending between endless chains 41, move generally horizontally across bale receiving platform 11 toward main frame 10; but that these members 42 are gradually and continuously rising above bale supporting rails 18 and 19 as the members 42 approach main frame 10. By the time the bale engaging members 42 have reached the open bottom end of elevator shaft 12 they occupy a position approximately one third of the way from the back wall 35 of the elevator shaft to the front wall 34 thereof. The space between plates 42 and the walls 34 and 35 is small enough that even the smallest bales cannot become wedged between the pusher plates and the elevator shaft walls.

To guide the bales from the horizontal plane of supporting rails 18 and 19 of bale receiving platform 11 to the vertical plane of wall 35 of the elevator shaft, an inclined bale supporting and guiding member 58 is mounted on frame 10. One end of member 58 is disposed in the horizontal plane of supporting rails 18 and 19 of the bale receiving platform, while the other end of member 58 is disposed in the vertical plane of side 35 of the elevator shaft. Member 58 is preferably an arcuate member whereby the ends thereof curve gently into the horizontal plane of the bale receiving platform and the vertical plane of one of the sides 35 of the elevator shaft. The bale supporting and guiding member 58 is also preferably substantially parallel to chain guiding members 46. A pair of arcuate rails 59 extend from the front of frame 10 up to the front 34 of vertical shaft 12 to prevent the possibility of bales, as shown by the letter B in FIG. 1, from toppling backward over the pusher plates 42 as the bale changes in attitude from horizontal to vertical. In passing up the vertical elevator shaft, the bales are supported on the members 42 and prevented from tipping off these members by the sides of the elevator shaft. There is relatively little frictional drag between the bales and walls 34 and 35; because, the bales are not pushed along the walls, they are carried upwardly between the walls. When the bale reaches the top of the elevator shaft, guide rails 40 tip the bale to the right as seen in FIG. 1 onto bale discharging platform 36. The pusher plates 52 turn about sprockets 48 and sweep horizontally across platform 36 to sprockets 49. Before the pusher plates 42 have reached sprockets 49 the bale will have moved onto discharging roller 39. Roller 39 feeds the bales off the end of the discharging platform 36 as the endless chains and pusher plates travel around sprockets 49 and begin their return run.

Roller 39 is important, since, it serves to propel bales beyond the reach of the members 42 as they travel downwardly around sprockets 49. Thus, if the elevator is feeding onto a horizontal conveyor, the bales are dropped onto the conveyor at a point spaced from sprockets 49 whereby the bales will not interfere with movement of the pusher plates 42 around the sprockets.

As shown in FIG. 1, in phantom, the bale receiving platform 11 may readily be pivoted from its horizontal working position to a vertical storage position about the pivotal connecting members 17.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described our invention, what we claim is:

An elevator for conveying bales of hay or the like from a lower level to an upper level comprising the combination of a base frame, an elongated bale receiving platform, pivot means connecting one end of said receiving platform to said base frame at said lower level for vertical pivotal movement between a horizontal operative position and a vertical storage position, a first sprocket journalled on said receiving platform at the end thereof opposite said one end, a four sided vertical elevator shaft mounted on said base frame and having a vertically opening bottom end spaced above the horizontal operative plane of said receiving platform and a vertically opening top end disposed at said upper level, an elongated arcuate bale guiding member mounted on said base frame and extending between one of said four sides of the vertical elevator shaft and said one end of said receiving platform when the receiving platform is in operative position, an arcuate chain guide track mounted on said base frame and extending parallel to said arcuate bale guiding member, a vertical chain guide track mounted on said elevator shaft and extending upwardly from said arcuate chain guide track to said vertically opening top end of said elevator shaft, bale discharging means mounted on said elevator shaft at said open top end thereof and having a bale supporting platform projecting in a horizontal plane from said one side of said elevator shaft at said upper level, said bale supporting platform having a discharge end spaced horizontally from said one side of said elevator shaft, a bale deflecting member carried by said bale discharging means and extending upwardly above said vertically opening top end of said elevator shaft at the side thereof opposite said bale supporting platform for tipping vertically emerging bales onto said bale supporting platform, a second sprocket journalled on said bale discharging means between said bale deflecting member and said bale supporting platform and overlying said vertical chain guide track, a third sprocket journalled on said bale discharging means at said discharge end of said bale supporting platform, an endless chain entrained about said sprockets and along said chain guide tracks in a feed run extending generally horizontally over the full length of said bale receiving platform then along said arcuate chain guide track and said vertical chain guide track to said second sprocket then horizontally along said bale supporting platform to said third sprocket, said endless chain extending in a returned run from said third sprocket to said first sprocket, drive means on said base frame drivingly engaging said return run of said endless chain, a plurality of bale engaging members carried by said endless chain and disposed to engage bales deposited on said receiving platform and propel said bales along said feed run to the discharge end of said bale supporting platform, a bale discharge roller journalled on said discharging means in the plane of said bale supporting platform and spaced beyond the discharge end thereof, and means driving said discharge roller from said third sprocket to deliver bales from said discharge platform as said bale engaging members travel about said third sprocket and begin their return run.

References Cited by the Examiner
UNITED STATES PATENTS

| | | | |
|---|---|---|---|
| 611,774 | 10/98 | Dennis. | |
| 790,811 | 5/05 | Alvey | 198—168 |
| 809,373 | 1/06 | Hof et al. | 198—137 X |
| 1,162,382 | 11/15 | Moore | 198—168 |
| 1,193,118 | 8/16 | Buck | 198—28 |
| 1,306,597 | 6/19 | Krogen. | |
| 1,460,172 | 6/23 | Nelson | 198—11 |
| 1,740,921 | 12/29 | Gotthardt. | |
| 1,845,066 | 2/32 | Walter. | |
| 2,326,165 | 8/43 | Pelosi | 198—168 |
| 2,343,444 | 3/44 | Coon | 198—13 |
| 2,372,902 | 4/45 | Lewis | 198—13 |
| 2,511,534 | 6/50 | Koppisch et al. | 198—28 X |
| 2,597,218 | 5/52 | Appel. | |
| 2,597,220 | 5/52 | Appel. | |
| 2,609,079 | 9/52 | Thompson | 198—28 |
| 2,639,024 | 5/53 | Kneer | 198—89 |
| 2,734,621 | 2/56 | Mojonnier | 198—137 X |
| 2,785,810 | 3/57 | Kneib | 198—7 X |
| 3,015,382 | 1/62 | Kaufmann | 198—206 |
| 3,034,667 | 5/62 | Kline et al. | 198—206 X |

SAMUEL F. COLEMAN, *Primary Examiner.*

WILLIAM B. LA BORDE, *Examiner.*